Patented Sept. 7, 1954

2,688,605

UNITED STATES PATENT OFFICE 2,688,605

METHOD OF COMPOUNDING POLYBUTADIENE WITH CARBON BLACK

Charles M. Tucker, Phillips, Tex., assignor to Phillips Petroleum Company, a corporation of Delaware No Drawing. Application April 5, 1951, Serial No. 219,529

13 Claims. (Cl. 260—41.5)

1

This invention relates to polymerizing butadiene while dispersed in an aqueous medium. In one aspect this invention relates to an improved process for polymerizing butadiene in an aqueous emulsion under such conditions that an easily processable synthetic rubber of improved properties and processing characteristics is produced. In another aspect this invention relates to a new product obtained by the emulsion polymerization of butadiene according to the process of my invention. In one embodiment, butadiene dispersed in an aqueous emulsion is polymerized at a temperature in the range of 60° to 95° F. to yield a polymer with an uncompounded Mooney viscosity in the range of 20 to 35, and the resulting latex is masterbatched with carbon black prior to coagulation of the polymer.

In the past, much time and effort has been expended in an attempt to prepare a polymer of butadiene which has satisfactory processing and wearing qualities to permit its use in tire treads, tire carcass stocks, and like applications. Although satisfactory copolymers of butadiene with other monomeric materials, such as styrene, having good abrasion resistance and other desirable physical properties have been prepared, particularly at relatively low temperatures, when attempts were made to prepare polymers from butadiene as the sole monomeric material it was found that such polymers were unsatisfactory for the uses described above for one or more of the following reasons. When butadiene is polymerized to a product with an uncompounded Mooney viscosity in the range normally employed for copolymers of butadiene and styrene, i. e., 40 to 50, it is extremely tough and difficult to process in the factory, and in addition, the physical properties are very poor. As a result, this type of polybutadiene is unsuitable for production and utilization on a commercial scale. When the Mooney value of the uncompounded polybutadiene was reduced in an attempt to overcome the extremely poor factory processing characteristics, the resulting coagulated polymer was soft and sticky and therefore extremely difficult to handle. Such material is also unsuitable for large scale commercial operations. When a low polymerization temperature such as that employed in the preparation of cold rubber is employed (14° F. or 41° F.), improvement in physical properties of the polymer was obtained, but the compound products prepared from this polymer became very sluggish at low temperatures since the polymer had a pronounced tendency to crystallize when cooled to subzero temperatures, and therefore polymers of polybutadiene prepared at these low temperatures were also unsuitable for use in tire treads and tire carcass stocks. When a polymerizing temperature such as that employed in the standard GR-S recipe (122° F.) is used, the polybutadiene is tough, difficult to process, and has poor physical characteristics.

2

By the practice of my invention, a synthetic polymer which has excellent factory processing characteristics as well as desirable physical properties can be prepared from butadiene as the sole monomeric ingredient of the polymerization process. Throughout the description, discussion, and claims, the term "butadiene" refers to 1,3-butadiene. According to my invention a synthetic polymer is prepared by polymerizing butadiene dispersed in an aqueous medium in the presence of an emulsifying agent at a temperature in the range of 60° to 95° F. while employing sufficient modifier to yield a polymer with an uncompounded Mooney viscosity in the range of 20 to 35, and masterbatching the resulting latex with carbon black prior to coagulation of the polymer to produce a synthetic rubber. The Mooney viscosity is ML, 212° F., at 4 min. according to A. S. T. M. Designation 927-49T. Low Mooney polybutadiene prepared according to my invention can be compounded and made into tires which do not become sluggish at temperatures ordinarily encountered in northern regions. At the same time, the physical properties of my synthetic rubber are markedly better than are those of polybutadiene prepared outside the temperature range which is employed in the practice of my invention. The low Mooney polybutadiene prepared according to the process of my invention, which has an uncompounded Mooney viscosity in the range of 20 to 35, not only has improved processing and finishing characteristics, but also possesses unexpectedly improved physical properties. When the polybutadiene, in latex form, prepared according to the process of my invention is masterbatched with carbon black, the resulting coagulated polymer containing the carbon black can be handled in a satisfactory manner in commercial processing and finishing steps. The synthetic rubber prepared according to my invention is considerably better than the standard GR-S synthetic rubber in a tread wear, and, in fact, has been found equal to the exceptionally good cold rubber prepared by polymerizing a butadiene-styrene mixture at 41° F. The factory processing characteristics of the synthetic rubber of my invention are also superior to those of the butadiene-styrene copolymer which has previously been employed for use in tire treads and tire carcass stocks. It has also been found that polybutadiene prepared according to my invention possesses excellent resistance to attack by ozone, and in this respect is superior to natural rubber and other types of synthetic rubber.

An object of this invention is to provide an improved process for the polymerization of butadiene.

Another object of this invention is to provide a process for the polymerization of butadiene whereby a synthetic rubber suitable for use in tire treads and tire carcass stocks is produced.

Another object of this invention is to provide a polymerization process for the production of a synthetic polymer from butadiene as the sole monomer ingredient in the process which has excellent factory processing characteristics as well as desirable physical properties.

Another object of this invention is to provide an improved process for polymerizing butadiene, while dispersed in water, to produce a polymer which can be easily processed and which has desirable physical properties.

Another object of this invention is to provide a process for the preparation of a polybutadiene-carbon black composition which is suitable for use in tire treads, tire carcass stocks, and the like.

Another object of this invention is to provide a polybutadiene-carbon black composition suitable for compounding with natural or synthetic rubber to improve the properties and working characteristics thereof.

Other objects will be apparent to those skilled in the art upon reading the accompanying disclosure and discussion.

Polybutadiene possessing wearing and processing characteristics unobtainable by processes of emulsion polymerization of butadiene known to the art can be obtained by the practice of my invention which comprises polymerizing butadiene dispersed in an aqueous emulsion at a temperature in the range of 60° to 95° F. in the presence of sufficient modifier to yield a polymer having an uncompounded Mooney viscosity in the range of 20 to 35 followed by masterbatching the latex obtained in the polymerizing step with carbon black prior to coagulation of the polymer. It is the cooperation of the factors of temperature control within the designated limits, Mooney viscosity control of the uncompounded polymer within the designated limits, and masterbatching of the latex with carbon black prior to coagulation of the polymer that makes possible the unexpected results obtained by the process of my invention, and, accordingly, a wide variety of recipes which have been previously employed primarily for the preparation of copolymers can be used for the preparation of polybutadiene according to the process of my invention. The unreacted butadiene is generally stripped from the latex prior to masterbatching and coagulation.

The following recipes are given as examples of some of the types of polymerization recipes which can be used in the process of my invention; however it is understood that the practice of my invention is not limited to these recipes since any suitable recipe for the emulsion polymerization of a conjugated diene is within the scope of my invention. It is also understood that the various specific ingredients and their proportions can be varied without departing from the spirit and scope of my invention.

RECIPE

| Persulfate | Diazothioether | Iron Pyrophosphate (Redox) | Polyalkylene Polyamine |
|---|---|---|---|
| Butadiene<br>Water<br>$K_2S_2O_8$<br>Modifier<br>Emulsifier | Butadiene<br>Water<br>Modifier<br>Emulsifier<br>Diazothioether | Butadiene<br>Water<br>Modifier<br>Hydroperoxide<br>Emulsifier<br>Sugar (optional)<br>$K_4P_2O_7$<br>$FeSO_4 \cdot 7H_2O$ | Butadiene<br>Water<br>KCl (optional)<br>KOH (optional)<br>Emulsifier<br>Modifier<br>Hydroperoxide<br>Polyalkylene Polyamine |

The monomer in each recipe will be butadiene and the aqueous emulsion is preferably an "oil in water" type. The term "aqueous emulsion" or "aqueous medium" should be construed to include use of an aqueous medium comprising water alone or water together with any desirable amount of a water-soluble component. The ratio of aqueous medium to butadiene or monomer ingredient is preferably in the range of 0.5 to 1 to 2.75 to 1 parts by weight.

The modifier in each recipe is preferably an alkyl mercaptan, and may be of primary, secondary, or tertiary configuration, and generally ranges from $C_8$ to $C_{16}$ compounds, but may have more or fewer carbon atoms per molecule. Mixtures or blends of these mercaptans are also frequently desirable and in many cases may be preferred to the pure compounds. The amount of modifier necessary to yield a polymer have an uncompounded Mooney viscosity within the designated range of 20 to 35 will vary depending, among other things, upon the particular recipe being used and upon the modifier (either pure mercaptan or a blend of several mercaptans) present in the recipe. The determination of the necessary amount of modifier in each case is within the skill of the art and is generally in the range of 0.2 parts to 1 part modifier per hundred parts of butadiene. In general, less modifier is needed to obtain the desired Mooney viscosity in the case of lower molecular weight mercaptans than with higher molecular weight mercaptans. Other modification agents known to the art, for example, dialkyl dixanthogens, diaryl mono- and di-sulfides, tetraalkyl thiuram mono- and di-sulfides, and mercaptothiazoles, can also be used to advantage in the process of my invention.

Emulsifying agents suitable for use in the practice of my invention include fatty acid soaps, e. g., potassium laurate, and potassium oleate, rosin acid soaps, and mixtures of fatty acid and rosin acid soaps. However other emulsifying agents, such as nonionic emulsifying agents, salts of alkyl aromatic sulfonic acids, salts of alkyl sulfates, and the like which produce favorable results under the conditions of the reaction, can also be used in practicing my invention, either alone or in admixture with soaps. The amount and kind of emulsifier used to obtain optimum results is somewhat dependent upon the particular recipe being used, the relative amounts of monomeric material and aqueous phase, and like variables. Usually an amount between about 0.3 and 5 parts per 100 parts of butadiene will be found to be sufficient, determination of the best amount for any given recipe being within the skill of the art.

Suitable hydroperoxides for use in iron pyrophosphate (redox) and polyalkylene polyamine recipes and other recipes calling for an oxygen-yielding material are preferably organic hydroperoxides having the formula RR'R''COOH wherein each of R, R', and R'' is an organic radical, or R'R'' together comprise a tetramethylene or pentamethylene group forming with the $$\text{R}-\overset{|}{\underset{|}{\text{C}}}\text{OOH}$$

a cyclopental or cyclohexylhydroperoxide. Each of R, R' and R'' can be completely hydrocarbon in character, and can be of mixed character, such as aralkyl, alkaryl, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether compounds, sulfur in similar compounds (i e., mercapto compounds and thioethers), and halogen compounds. Examples of such hydroperoxides include diisopropyl hydroperoxide (isopropyl (dimethyl) hydroperoxymethane), cumene hydroperoxide (phenyl (dimethyl) hydroperoxymethane), 1-methyl-1-hydroperoxycyclopentane, tetralin hydroperoxide, phenylcyclohexane hydroperoxide, octahydrophenanthrene hydroperoxide, diisopropylbenzene hydroperoxide (dimethyl (isopropylphenyl) hydroperoxymethane), methylethyl (ethoxyphenyl) hydroperoxymethane, methyldecyl (methylphenyl) hydroperoxymethane, dimethyldecylhydroperoxymethane, methylchlorophenylphenylhydroperoxymethane, and tertiarybutylisopropylbenzene hydroperoxide (dimethyl (tertiary-butylphenyl) hydroperoxymethane).

Such hydroperoxides can be easily prepared by simple oxidation, with free oxygen, of the corresponding hydrocarbon or hydrocarbon derivative i. e., of the parent trisubstituted methane. The compound to be oxidized is placed in a reactor, heated to the desired temperature, and oxygen introduced at a controlled rate throughout the reaction period. The mixture is agitated during the reaction which is generally allowed to continue from about one to ten hours. The temperature employed is preferably maintained between 50 and 160° C., although in some instances it might be desirable to operate outside this range, that is, at either higher or lower temperatures. At the conclusion of the reaction the oxidized mixture may be employed as such, that is, as a solution of the hydroperoxide composition in the parent compound, or unreacted compound may be stripped and the residual material employed. The major active ingredient in such a composition is the monohydroperoxide, or a mixture of monohydroperoxides. The hydroperoxide group appears to result from introduction of two oxygen atoms between the carbon atom of the trisubstituted methane and the single hydrogen atom attached thereto. Where there is another similar grouping in the molecule, the usual method of production just outlined appears to produce only the monohydroperoxide even though a dihydroperoxide appears to be structurally possible. Thus, in a simple case, from such an oxidation of diisopropylbenzene the primary product appears to be dimethyl(isopropylphenyl) hydroperoxymethane.

One large group of these hydroperoxymethanes is that group in which each of the three substituents groups is a hydrocarbon radical. One of the subgroups of these compounds is the alkaryldialkyl hydroperoxymethanes, in which the two alkyl groups are relatively short, i. e., have from one to three or four carbon atoms each, including dimethyl(tertiary-butylphenyl) hydroperoxymethane, dimethyl(diisopropylphenyl) hydroperoxymethane, dimethyl(isopropylphenyl) hydroperoxymethane, dimethyl(dodecylphenyl) hydroperoxymethane, dimethyl(methylphenyl) hydroperoxymethane, and corresponding methylethyl and diethyl compounds, and the like. Another subgroup includes at least one long alkyl group directly attached to the hydroperoxymethane, such as methyldecyl(methylphenyl) hydroperoxymethane, ethyldecylphenylhydroperoxymethane, and the like. Still another subgroup includes trialkyl compounds, such as dimethyldecylhydroperoxymethane, and the like; aralkyl compounds, such as 1-phenyl-3-methyl-3-hydroperoxybutane, can also be considered to be members of this group. A further subgroup includes alkyldiaryl compounds, such as methyldiphenylhydroperoxymethane, methylphenyltolylhydroperoxymethane, and the like. A further subgroup is the triaryl compounds, such as triphenylhydroperoxymethane, tritolylhydroperoxymethane, and the like. A further subgroup comprises cyclopentyl and cyclohexyl hydroperoxides, such as result from oxidation of cyclohexane, methylcyclopentane, and phenylcyclohexane, and compounds containing condensed ring structures such as 1,2,3,4,4*a*,9,10,10*a*-octahydrophenanthrene, which forms the corresponding hydroperoxide upon oxidation, etc., the organic hydroperoxides preferably will have a total of not more than thirty carbon atoms per molecule, and the most active hydroperoxides usually have at least ten to twelve carbon atoms per molecule. Mixtures of these hydroperoxides can be used, as desired.

The amount of organic hydroperoxide used to obtain an optimum reaction rate will depend upon the polymerization recipe employed and upon the specific reaction conditions. The amout is generally expressed in millimols per 100 parts of butadiene, using in each instance the same units of weight throughout, i. e., when the butadiene is measured in pounds the hydroperoxide is measured in millipound mols. The same is true for other ingredients in the polymerization recipe. The optimum rate of polymerization is usually obtained with the amount of hydroperoxide between 0.01 and 10 millimols per 100 parts by weight of butadiene.

In the case of a diazothioether recipe, preferable diazothioethers have the formula R—N=N—S—R' where R and R' are aromatic groups containing substituents such as alkyl, chloro, nitro, methoxy, sulfonate, and the like. These compounds act both as initiators and as modifiers in a polymerization recipe and hence may be used as both catalysts and modifiers in the recipe. However it is preferred to use a modifier of the type noted above along with the diazothioether in the practice of my invention. In certain instances, it may also be desirable to use a catalyst such as potassium or sodium ferricyanide in conjunction with the diazothioether.

Examples of suitable diazothioethers include 2-(2,4-dimethyl - benzenediazomercapto) naphthalene, 2 - (4-methoxybenzenediazomercapto) - naphthalene (known in the art as MDM), 2 - (2-methylbenezenediazomercapto) napthalene, 2 - (2,5 - dimethoxybenzenediazomercapto) naphthalene, 4 - (2,5 - dimethoxybenzenediazomercapto) toluene, 4 - (2 - naphthalenediazomercapto) anisole, 2 - (4 - acetylaminobenzenediazomerto) naphthalene, 2-(benzendiazomercapto) naphthalene, 2 - (4 - sulfobenzenediazomercapto) benzothiazole, 2 - (1 - napthalenediazomercapto) - naphthalene, 2 - (4 - chlorobenzenediazomercapto) naphthalene, 2 - (5 - quinolinediazomercapto) naphthalene, 2 - (4 - nitrobenzendiazomercapto) naphthalene, and the like.

The type and amount of diazothioether used in a particular polymerization recipe depends upon the result desired. In general, approximately 0.2 part by weight of diazothioether per 100 parts of butadiene will give satisfactory promotion of the polymerization reaction although other proportions within the range of about 0.5 to about 5.0 parts by weight per 100 parts by weight of butadiene, can be used. The diazothioether can be added in increments throughout the polymerization reaction in order to provide more uniform modification and to obtain more efficient utilization of the diazothioether. If the diazothioether is used alone to modify the polymer, somewhat larger quantities are needed than is the case if other modifiers are used in conjunction therewith.

In the case of an iron pyrophosphate (redox) recipe, the presence of a sugar or similar reducing agent is optional, although use of such material is generally preferred. Suitable reducing agents (also known as activating agents) include fructose, dextrose, sucrose, benzoin, acetylacetone, ascorbic acid, sorbitol, benzaldehyde, and the like.

When a ferrous pyrophosphate activator is used in an iron pyrophosphate (redox) recipe, it is preferably prepared by admixing a ferrous salt, such as ferrous sulfate, with a pyrophosphate of an alkali metal, such as sodium or potassium, with water and heating this mixture, preferably for the length of time required for maximum activity. A reaction occurs between the salts, as evidenced by the formation of a grayish-green precipitate. When preparing the activator the mixture is generally heated above 122° F., for variable periods depending upon the temperature. For example, if the mixture is boiled, a period of twenty minutes or less is sufficient to produce the desired activity, and the time of boiling may even be as low as 30 seconds. One convenient method of operation involves maintaining the temperature of the activator solution at about 140° F. for a period of heating ranging from 10 to 30 minutes. Prior to heating the activator mixture the vessel is usually flushed with an inert gas such as nitrogen. In general it is preferred to heat the mixture below the boiling point, say at a temperature around 130° to 165° F.

In cases where the activator is prepared just prior to use, it is generally employed in the form of an aqueous dispersion as described above. However, the solid activator may be isolated and the crystalline product used, and it is preferred in this form in some instances. Subsequent to heating the activator mixture, it is cooled to about room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the butadiene. This crystalline material is believed to be a sodium ferrous pyrophosphate complex, such as might be exemplified by the formula $2Na_2FeP_2O_7 \cdot Na_4P_2O_7$, or perhaps $Na_2FeP_2O_7$. In any event the complex, whatever its composition, is one active form of ferrous iron and pyrohosphate which can be successfully used in my invention. It may be incorporated in the polymerization mixture as such, or may be dispersed in water. Other forms of multivalent metal, e. g., copper, and pyrophosphate may also be used, so long as there is present in the reacting mixture a soluble form of a multivalent metal, capable of existing in two valence states and present primarily in the lower of two valence states, and a pyrophosphate.

The amounts of activator ingredients to be charged in an iron pyrophosphate recipe are usually expressed in terms of butadiene charged. The multivalent metal should be within the range of 0.10 to 3 millimols per 100 parts by weight of butadiene, with 0.2 to 2.5 millimols being generally preferred. The amount of pyrophosphate should be within the range of 0.10 to 5.6 millimols based on 100 parts by weight of butadiene; however the narrower range of 0.2 to 2.5 millimols is more frequently preferred. The mol ratio of ferrous salt to alkali metal pyrophosphate can be between 1 to 20 and 1 to 3.5 with a preferred ratio between 1 to 0.35 and 1 to 2.8.

In the case of a polyalkylene polyamine recipe, the activating agent, i. e., a polyalkylene polyamine is preferably a polyethylene polyamine or a trimethylene polyamine. Suitable polyethylene polyamines have the general formula $$RNH(CHXCHXNH)_m(CHXCHX)_nNHR$$

where R contains not more than eight carbon atoms and is of the group consisting of hydrogen, alkyl, naphthenic, aromatic, olefinic and cycloolefinic radicals, each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and R can be of mixed character when containing six or more carbon atoms, such as alkylcycloalkyl, aralkyl, alkaryl groups, and the like, and both R and X can also have non-hydrocarbon substituents; particularly useful non-hydrocarbon constituents include oxygen in the form of hydroxy and ether compounds, sulfur in similar compounds (i. e., mercapto compounds and thioethers), and halogen compounds. Examples of such polyethylene polyamines include ethylene diamine, hydrazine, diethylenetriamine, tetraethylenepentamine, dipropylenetriamine, 2-methyl-3-azopentane-1,5-diamine, N-(2-hydroxy-ethyl)-1,2-ethanediamine, N-phenylethylenediamine, N-cyclohexyl-N'-(2-aminoethyl)-1,2-ethanediamine, N-(2-hydroxy - tertiary-butyl)-1,2-propylenediamine, carbamates of the foregoing, and the like.

Suitable trimethylene polyamines are preferably those having the general formula

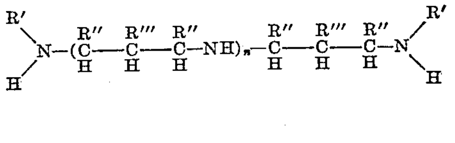

where each R' is one of the group consisting of hydrogen, methyl, ethyl, hydroxymethyl, hydroxyethyl, and carboxy radicals, each R'' is hydrogen or methyl, and each R''' is hydrogen, methyl, or an activating substituent of the group consisting of —OR, —SR, NR$_2$, —CN, —SCN, —COOR, —CHO, with R being hydrogen, methyl, ethyl, n-propyl, or isopropyl, or —CHR''' can be >C=O, and $n$ is an integer between 0 and 8 inclusive. The compounds containing a single trimethylene group together with its two terminal amine groups is preferred. The simplest of these trimethylene polyamines, or 1,3-diaminopropanes, is 1,3-diaminopropane itself. This compound is also known as trimethylenediamine. Substitution of an —OH or a =O on the central carbon atom of 1,3-diaminopropane appears to enhance the activity in the emulsion polymerization recipes, hence 1,3-diaminoacetone and 1,3-diamine-2-propanol are at present the most preferred 1,3-diaminopropanes. Other 1,3-diaminopropanes, which contain a plurality of trimethylene (unsubstituted or substituted) groups alternating with amino groups, and which are regarded as polymers of the parent compound, can also be employed; for example tri(trimethylene)tetramine (sometimes erroneously designated as tripropylenetetramine) is considered to be a polymer of trimethylenediamine. All of the polyamine compounds referred to above have the basic structure of 1,3-diaminopropane and hence can be broadly referred to as "1,3-diaminopropane and its derivatives and polymers thereof"; they can also be broadly referred to as "1,3-diaminopropanes" and also as "trimethylene polyamines." It is preferred to use only those polyamines which come within the structural formula defined hereinabove, and all of the compounds so defined are operable in my process to some extent though it will of course be appreciated that the relative activities and efficacies will vary considerably depending upon the size of the molecule and the various constituents thereof, as well as upon the other components and their proportions in the various recipes which may be used. Those skilled in the art will readily ascertain any of the specific compounds which are within the scope of the structural formula. However, by way of example the following are mentioned: 1,3-diaminopropane, 1,3-diamino-acetone, 1,3-diamino-2-propanol, N,N'-dimethyl-1,3-diaminoacetone, N-ethoxy-1,3-diamino-2-propanol, 1,3-diamino-2-carboxypropane, 1,3-diamino-2-(dimethylamino)-propane, 2,4-diaminopentane, 1,3-diamino-2-cyanopropane, 1,3-diamino-2-mercaptopropane, di(trimethylene)triamine, tri(trimethylene)tetramine, tetra(trimethylene)pentamine, polytrimethylene polyamines in which the amino and trimethylene groups can be substituted as previously mentioned, and carbamates of each of the foregoing.

These polyalkylene polyamine activator compositions appear to serve as reductants and/or activators in the polymerization mixture, and no other activating ingredients, such as compounds of polyvalent-multivalent metals, need be added in order to obtain satisfactory and rapid polymerization of the butadiene, except as such compounds may fortuitously be present as traces in the polymerization mixture. Similarly, no other reducing ingredient, such as a reducing sugar, need be added.

The amount of polyalkyene polyamine to be used in any particular case depends upon such variables as the polyamine used, specific ingredients of recipe, and conditions of reaction. In general, amounts of polyalkylene polyamine in the range of 0.1 to 2 parts of polyalkylene polyamine per 100 parts of butadiene will give satisfactory results; however greater or smaller amounts of polyamine can be used.

The above recipes can vary widely in the particular combination of ingredients and their relative proportions when utilized in the process of my invention. The following recipes are presented as typical or representative of each type and are not to be construed so as to unduly limit my invention. The proportions are given as parts by weight.

RECIPE

| Persulfate | Diazothioether | Iron Pyrophosphate (Redox) | Polyalkylene Polyamine |
|---|---|---|---|
| Butadiene, 100<br>Water, 180<br>K$_2$S$_2$O$_8$, 0.3<br>Dodecyl mercaptan,[1] 0.75<br>Soap flakes, 5.0 | Butadiene, 100<br>Water, 180<br>MTM,[2] 0.35<br>MDN,[3] 0.2<br>Soap, 5 | Butadiene, 100<br>Water, 180<br>MTM,[4] 0.5<br>Cumene hydroperoxide, 0.17<br>Dresinate 214,[5] 5<br>Fructose, 0.5<br>K$_4$P$_2$O$_7$, 1.5<br>FeSO$_4$·7H$_2$O, 0.017 | Butadiene, 100<br>Water, 180<br>KCl, 0.8<br>KOH, 0.112<br>Potassium laurate, 5<br>MTM,[6] 0.4<br>Cumene hydroperoxide, 0.21<br>Tetraethylenepentamine, 0.4 |

[1] A mixture of primary mercaptans, primarily C$_{12}$ with small amounts of C$_{10}$, C$_{14}$, and C$_{16}$ primary mercaptans.
[2] A mixture of tertiary C$_{12}$, C$_{14}$, and C$_{16}$ mercaptans in a ratio of 3:1:1 parts by weight.
[3] 2-(4-methoxybenzenediazomercapto)naphthalene.
[4] Same as (2).
[5] A potassium base rosin soap.
[6] Same as (2).

According to the process of my invention a polymerization recipe according to the above description is charged into a reactor and polymerization is effected at a temperature in the range of 50° to 95° F. Suitable equipment and order of addition of reactants are known to the art and therefore need not be set forth in order to provide a clear understanding of my invention. The polymerization is effected in the presence of sufficient modifier to yield an uncompounded polymer having a Mooney viscosity in the range of 20 to 35. The polymerization reaction is continued for a time sufficient to yield the desired conversion, generally at least 50 per cent, and preferably in the range of 60 to 75 per cent, and in some cases up to nearly quantitative conversion. The time required in any particular reaction will depend, among other things, upon the particular recipe being used, conditions of reaction, and degree of conversion desired. The determination of time of reaction and desired degree of conversion in any particular case is within the skill of the art. When the desired degree of conversion is attained, and any unreacted monomers removed, the resulting latex is masterbatched with carbon black prior to coagulation of the polymer.

Any carbon black suitable for compounding as a filler can be used in the masterbatching step of my process. For example, high pH furnace carbon blacks having a pH of from 8.0 to 10.5, usually from 8.6 to 10.1, such as high abrasion furnace carbon blacks (HAF blacks), super abrasion furnace carbon blacks (SAF blacks), and high modulus furnace carbon blacks (HMF blacks); reinforcing furnace blacks (RF blacks) and very fine furnace blacks (VFF blacks); easy, medium, or hard processing channel blacks; lamp blacks fine and medium thermal carbon blacks; acetylene carbon blacks; semi-reinforcing furnace carbon blacks; conductive furnace and conductive channel blacks; and high elongation furnace carbon blacks. In the case of polybutadiene for use in tire treads Philblack O (a trade-mark of Phillips Petroleum Company), which is an HAF black, is preferable, and in the case of polybutadiene for use in tire carcass stocks Philblack A (a trade-mark of Phillips Petroleum Company), which is an HMF black, is preferable.

The carbon black can be added to the latex in the form of a dispersion or slurry in water, or the carbon black can be incorporated in the latex in any other suitable manner such as by adding a dry, powdered carbon black to the latex and agitating the mixture. The quantity of carbon black to be added is in the range of 20 to 75 parts per 100 parts of solids in the latex. The carbon black can all be added to the latex and thus masterbatched prior to coagulation, or part (at least 20 parts of carbon black per 100 parts of solids in the latex) of the carbon black can be masterbatched with the latex prior to coagulation of the polymer and the remainder (up to 75 parts per 100 parts of solids in the latex) added on the mill when compounding the polymer. I prefer to masterbatch a quantity of carbon black with the latex that is slightly less than the amount desired in the final rubber, and add the remainder on the mill. This method of operation tends to avoid the addition of excessive amounts of carbon black to the rubber.

After the carbon black has been thoroughly distributed throughout the latex, the polymer is coagulated in any conventional manner such as by the brine-acid or brine-alcohol method of coagulation. Following coagulation, the polymer is further treated and processed in a conventional manner, i. e., washed, dried, and compounded according to known compounding formulas.

Polybutadiene prepared according to the process of my invention can be compounded and used in tire treads, tire carcass stocks and the like, or the polybutadiene can be compounded with natural or synthetic rubber (for example a butadiene-styrene copolymer) and used in like applications. In the case where polybutadiene prepared according to my invention is compounded with natural or synthetic rubber, blending may be accomplished by mixing a polybutadiene masterbatch latex with a natural or synthetic rubber latex with subsequent coagulation according to conventional methods, or the polybutadiene polymer of my invention can be blended with natural or synthetic rubber my mill mixing after coagulation of the polybutadiene masterbatch. The ratio of polybutadiene to natural or synthetic rubber for such compounding may vary over a wide range; however I prefer a ratio in the range 1 to 3 to 1 to 1.

The following examples will serve to illustrate the process, product, and advantages of my invention; however the specific ingredients, proportions thereof, and the like should not be construed so as to unduly limit the invention.

*Example I*

Polybutadiene was prepared at a polymerization temperature of 86° F. according to the following recipe:

| | Parts by weight |
|---|---|
| Water, Total [1] | 180 |
| Butadiene | 100 |
| Dresinate 214 [2] | 4.0 |
| MTM [3] | 0.50 |
| Cumene hydroperoxide | 0.025 |
| KOH | 0.10 |
| Daxad 11 [4] | 0.10 |
| $Na_3PO_4 \cdot 12H_2O$ | 0.50 |
| Dextrose | 0.25 |
| $K_4P_2O_7$ | 0.018 |
| $FeSO_4 \cdot 7H_2O$ | 0.014 |

[1] Total water present including that added in soap solution and in activator solution.
[2] Potassium salt of rosin soap.
[3] A blend of tertiary $C_{12}$, $C_{14}$, and $C_{16}$ aliphatic mercaptans in a ratio of 3 : 1 : 1 parts by weight.
[4] A sodium salt of condensed alkyl aryl sulfonic acid.

The activator solution (reaction product of $K_4P_2O_7$ and $FeSO_4 \cdot 7H_2O$) was prepared according to the following procedure: the ferrous sulfate was dissolved in water which had been adjusted to a pH of 3.0 to 4.0 by the addition of 5 per cent sulfuric acid. The potassium pyrophosphate was then added and the solution heated to 140° F. and cooled immediately to room temperature.

The polymerization was effected in a glass lined, jacketed reactor, the ingredients being charged in the following order.

1. Soap solution comprising water, Dresinate 214, trisodium phosphate, potassium hydroxide, dextrose, and Daxad 11.
2. Mercaptan (MTM), activator (prepared according to above procedure), when the temperature reached 86° M.
3. Butadiene.
4. Cumene hydroperoxide.

The mixture was agitated throughout the polymerization reaction and the temperature was maintained at 86° F.

When a conversion of 58.8 per cent was reached, the reaction was shortstopped by the addition of 0.15 part dinitrochlorobenzene (based on butadiene charged). The reaction mixture was then vented to remove unreacted butadiene, and the latex stabilized by the addition of 1.5 per cent phenyl-beta-naphthylamine, based on the rubber.

The stabilized latex resulting from the polymerization reaction was masterbatched with Philblack O (a trade-mark of Phillips Petroleum Company) slurry prepared according to the following recipe:

| Ingredient: | Parts by weight |
|---|---|
| Philblack O [1] | 100 |
| Water | 850 |
| Marasperse CB [2] | 2.2 |
| Sodium hydroxide | 0.3 |

[1] A trade-mark of Phillips Petroleum Company.
[2] Sodium lignin sulfonate.

A sufficient amount of the slurry was blended with the latex to produce a final product containing 47.5 parts carbon black per 100 parts rubber. An additional 2.5 parts of Philblack O (a trade-mark of Phillips Petroleum Company) per 100 parts of rubber was added on the mill in compounding to produce a final rubber containing 50 parts Philblack O per 100 parts of rubber.

Following masterbatching of the latex with carbon black, the polymer was coagulated by the brine acid method. The latex was creamed with brine and the crumb was flocculated at a pH of 2.0 to 4.0 and a temperature of 120° F. The rubber was then given two acid washes at 120° F. and one cold water wash.

The coagulated polymer was dried in a tray drier at 170° F. The resulting polybutadiene polymer had an uncompounded Mooney viscosity of 22.

After coagulation, washing and drying the polymer was compounded according to the following recipe:

| | Parts by weight |
|---|---|
| Masterbatch (polybutadiene plus Philblack O [3]) | 150.0 |
| Zinc oxide | 3.0 |
| Stearic acid | 1.0 |
| Flexamine [1] | 1.0 |
| Circosol-2XH-Paraflux [2] | 5.0 |
| Sulfur | 2.25 |
| Accelerator | variable |

[1] Mixture containing 65 per cent of a complex diarylamine-ketone reaction product and 35 per cent of N,N'-diphenyl-p-phenylenediamine.
[2] A blend of equal parts of Circosol-2XH (a petroleum hydrocarbon softener) and Paraflux (an asphaltic flux).
[3] A trade-mark of Phillips Petroleum Company.

The physical properties employing the various accelerators are shown in the following table. The stocks were cured at 307° F. for 30 minutes unless otherwise indicated. A 41° F. butadiene-styrene elastomer control was used.

*Example II*

The effect of polybutadiene masterbatch prepared according to Example I on the physical properties and scorch characteristics of natural rubber-Philblack O (a trade-mark of Phillips Petroleum Company) compounds has been studied. The basic compounding recipes are given below. The polybutadiene masterbatch was prepared according to Example I and contained 50 parts Philblack O (a trade-mark of Phillips Petroleum Company) per 100 parts polybutadiene and was used in sufficient quantity to furnish the amount of polybutadiene specified in each recipe. A quantity of carbon black was added on the mill such as was required to bring the total amount in the recipe up to 50 parts.

| Recipe No. | Parts by Weight | | | | |
|---|---|---|---|---|---|
| | 1 | 2 | 3 | 4 | 5 |
| Natural rubber | 100 | 75 | 75 | 50 | 50 |
| Polybutadiene | | 25 | 25 | 50 | 50 |
| Philblack O [1] | 50 | 50 | 50 | 50 | 50 |
| Zinc oxide | 4 | 4 | 4 | 4 | 4 |
| Pine tar | 3 | 3 | 3 | 3 | 3 |
| Agerite powder [2] | 1 | 1 | 1 | 1 | 1 |
| Sulfur | 2 | 2 | 2 | 2 | 2 |
| Santocure [3] | 0.5 | 0.5 | 0.75 | 0.75 | 1.0 |
| Stearic acid | 3 | 3 | 3 | 3 | 3 |

[1] A trade-mark of Phillips Petroleum Company—a high abrasion furnace black.
[2] Phenyl-beta-naphthylamine.
[3] N-cyclohexyl-2-benzothiazolesulfenamide.

30 MINUTE CURE—POLYBUTADIENE MASTERBATCH

| Accelerator | PHR [1] Accelerator | 80° F. 300 Percent Modulus, p. s. i. | 80° F. Tensile, p. s. i. | 80° F. Percent Elongation | 200° F., Tensile, p. s. i. | ΔT°, F. | Percent Permanent Set | Percent Resilience | Flex Life, M [2] | Shore Hardness | Abrasion Loss | Percent Compression Set | MS 1½ at 212° F. | Minutes to Scorch at 280° F. |
|---|---|---|---|---|---|---|---|---|---|---|---|---|---|---|
| Santocure [3] | 1.5 | 1,840 | 2,420 | 375 | -------- | 69.9 | 2.9 | 64.1 | 2.9 | 63 | 4.27 | 20.9 | 25.5 | 15.5 |
| Santocure [3] / A-32 [4] | 1.25 / 0.25 | 1,970 | 2,610 | 380 | -------- | 68.3 | 2.4 | 64.4 | 3.0 | 63 | 4.23 | 17.9 | 25 | 13 |
| 2MT [5] / 808 [6] | 1.25 / 0.25 | 1,960 | 2,550 | 400 | -------- | 66.2 | 2.5 | 66.5 | 4.2 | 64.5 | 4.40 | 31.5 | 26 | 11 |

BUTADIENE/STYRENE ELASTOMER (41° CONTROL)

| | | | | | | | | | | | | | | |
|---|---|---|---|---|---|---|---|---|---|---|---|---|---|---|
| Santocure [3] | 1.0 | 1,680 | 3,820 | 560 | -------- | 74.0 | 4.5 | 58.7 | 14.7 | 57 | 2.62 | 19.1 | 45.5 | 13.0 |

45 MINUTE CURE—POLYBUTADIENE MASTERBATCH

| | | | | | | | | | | | | | | |
|---|---|---|---|---|---|---|---|---|---|---|---|---|---|---|
| Santocure [3] | -------- | 2,000 | 2,340 | 345 | 1,440 | 69.3 | 1.3 | 63.7 | 2.2 | 62 | 5.80 | 10.5 | -------- | -------- |
| Santocure [3] / A-32 [4] | -------- | 1,990 | 2,550 | 370 | 1,490 | 68.6 | 1.3 | 64.1 | 3.3 | 62 | 5.75 | 10.2 | -------- | -------- |
| 2MT [5] / 808 [6] | -------- | -------- | 2,200 | 300 | 1,080 | 65.2 | 1.3 | 66.8 | 2.4 | 65 | 7.01 | 19.0 | -------- | -------- |

BUTADIENE/STYRENE ELASTOMER (41° F. CONTROL)

| | | | | | | | | | | | | | | |
|---|---|---|---|---|---|---|---|---|---|---|---|---|---|---|
| Santocure [3] | -------- | 1,880 | 3,930 | 495 | 2,460 | 68.6 | 2.0 | 61.0 | 12.4 | 58 | 5.47 | 10.0 | -------- | -------- |

[1] Parts per 100 parts rubber.
[2] Thousands of flexures to failure.
[3] N-cyclohexyl-2-benzothiazolesulfenamide.
[4] Reaction product of butyraldehyde and butylidene aniline.
[5] 2-mercaptothiazoline.
[6] Condensation product of butyraldehyde and aniline.

The mixes were milled and cured 30 minutes (unless otherwise specified) at 307° F. and the physical properties determined. The following results were obtained:

UNAGED SAMPLES

| Rubber (Compounding Recipe No.) | PHR [1] Santocure | 80° F. | | | 200° F.,[2] Tensile p.s.i. | ΔT, ° F. | Percent Resilience | Flex Life [3] | Shore Hardness | Abrasion Loss,[4] grams | Percent compression Set | MS 1½ Scorch | | Extrusion, grams/min. |
|---|---|---|---|---|---|---|---|---|---|---|---|---|---|---|
| | | 300% Modulus, p.s.i. | Tensile, p.s.i. | Percent Elongation | | | | | | | | at 212° F., Minutes | at 250° F. | |
| 1 | 0.5 | 1,580 | 3,700 | 540 | 2,990 | 46.9 | 70.4 | 10 | 58 | 5.85 | 17.0 | 38.5 | 12.0 | 79 |
| 2 | 0.5 | 1,320 | 3,220 | 580 | 2,640 | 61.9 | 63.9 | 10 | 55 | 4.59 | 23.7 | 35.0 | 27.5 | 79 |
| 3 | 0.75 | 1,620 | 3,560 | 560 | 2,890 | 54.1 | 69.5 | 38 | 59 | 3.82 | 16.5 | 34.0 | 20.5 | 79.5 |
| 4 | 0.75 | 1,210 | 2,700 | 575 | 2,130 | 74.7 | 59.3 | 53 | 56 | 4.60 | 25.1 | 30 | >30 | 83.5 |
| 5 | 1.0 | 1,430 | 2,890 | 525 | 2,160 | 65.2 | 63.6 | 54 | 59 | 3.98 | 20.8 | 30 | >30 | 85 |

OVEN AGED 24 HOURS AT 212° F.

| | | | | | | | | | | | | | | |
|---|---|---|---|---|---|---|---|---|---|---|---|---|---|---|
| 1 | 0.5 | 1,830 | 2,040 | 340 | -------- | 47.6 | 72.1 | 24.2 | 60 | 7.65 | -------- | -------- | -------- | -------- |
| 2 | 0.5 | 1,780 | 2,100 | 345 | -------- | 53.0 | 68.7 | 13.8 | 62 | 7.41 | -------- | -------- | -------- | -------- |
| 3 | 0.75 | 2,190 | 2,480 | 350 | -------- | 49.7 | 71.6 | 15.1 | 64 | 6.92 | -------- | -------- | -------- | -------- |
| 4 | 0.75 | 1,850 | 2,360 | 390 | -------- | 59.9 | 65.2 | 8.5 | 64 | 6.23 | -------- | -------- | -------- | -------- |
| 5 | 1.0 | 2,170 | 2,580 | 350 | -------- | 56.5 | 69.3 | 16.8 | 65 | 6.17 | -------- | -------- | -------- | -------- |

[1] Parts per 100 parts rubber.
[2] 45 minute cure.
[3] Percent broken at 50,000 flexures.
[4] 35 minute cure.

The foregoing data shows that the overall properties of natural rubber, when compounded with the polybutadiene of my invention, are good, and that several properties are definitely improved. For example, the flex life of the unaged samples is improved as much as 440 per cent in the case of recipe number 5. The abrasion loss characteristics of the polybutadiene-natural rubber samples are improved as much as 34 per cent over that of natural rubber. Further, the scorch characteristics of the compounded samples are from 70 to 150 per cent improved over that of natural rubber. Thus it is apparent that the polybutadiene of my invention can be used to great advantage in compounding with natural rubber.

*Example III*

The effect of polybutadiene prepared according to Example I on the physical properties of 41° F. butadiene-styrene rubber has also been investigated. The basic compounding recipes are given below. The polybutadiene masterbatch was prepared according to Example I and contained 50 parts Philblack O (a trade-mark of Phillips Petrolenum Company) per 100 parts polybutadiene and was used in sufficient quantity to furnish the amount of polybutadiene specified in each recipe. A quantity of carbon black was added on the mill such as was required to bring the total amount of carbon black in the recipe up to 50 parts.

| | Parts by Weight | | | | | | | | |
|---|---|---|---|---|---|---|---|---|---|
| Recipe No. | 1 | 2 | 3 | 4 | 5 | 6 | 7 | 8 | 9 |
| Butadiene/Styrene Elastomer (41° F.) | 0 | 50 | 75 | 100 | 100 | 50 | 75 | 100 | 100 |
| Polybutadiene | 100 | 50 | 25 | 0 | 0 | 50 | 25 | 0 | 0 |
| Philblack O [1] | 50 | 50 | 50 | 50 | 50 | 50 | 50 | 50 | 50 |
| Zinc Oxide | 3 | 3 | 3 | 3 | 3 | 3 | 3 | 3 | 3 |
| Stearic Oxide | 1 | 1 | 1 | 1 | 1 | 1 | 1 | 1 | 1 |
| Flexamine [2] | 1 | 1 | 1 | 1 | 1 | 1 | 1 | 1 | 1 |
| Circosol-2XH-Paraflux [3] | 0 | 5 | 7.5 | 10 | 10 | 0 | 0 | 5 | 5 |
| Sulfur | 2.25 | 2 | 1.875 | 1.75 | 1.75 | 2 | 1.875 | 1.75 | 1.75 |
| Santocure [4] | 1.5 | 1.25 | 1.125 | 1 | 1 | 1.25 | 1.125 | 1 | 1 |

[1] A trade-mark of Phillips Petroleum Company.
[2] Mixture containing 65 percent of a complex diarylamine-ketone reaction product and 35 percent of N,N'-diphenyl-p-phenylenediamine.
[3] A blend of equal parts of Circosol-2XH (a petroleum hydrocarbon softener) and Paraflux (an asphaltic flux).
[4] N-cyclohexyl-2-benzothiazolesulfenamide.

The mixtures were milled and cured 30 minutes (unless otherwise specified) at 307° F. Physical properties before and after oven aging for 24 hours at 212° F. are presented in the following table.

UNAGED

| Recipe No. | Parts Polybutadiene | Parts 41° F. Rubber | PHR[4] Circo-Para[1] | 80° F. 300% Modulus, p.s.i. | 80° F. Tensile, p.s.i. | 80° F. Percent Elongation | 200° F.[2] Tensile, p.s.i. | 200° F.[2] Percent Elongation | ΔT, ° F. | 10% Dynamic, p.s.i. Initial | 10% Dynamic, p.s.i. Final | Percent Permanent Set | Percent Resilience | Flex Life, 210° F., M[3] | Shore Hardness | Abrasion Loss, Gms. | Percent Compression Set | Compounded MS 1½ | Scorch, 280° F. Minimum Mooney | Scorch, 280° F. Minutes to Scorch | Extrusion, 250° F. In./Min. | Extrusion, 250° F. Gms./Min. | Extrusion, 250° F. Rating |
|---|---|---|---|---|---|---|---|---|---|---|---|---|---|---|---|---|---|---|---|---|---|---|---|
| 1 | 100 | ---- | ----- | 2,570 | 2,670 | 310 | 1,270 | 160 | 63.2 | 204.3 | 236.0 | 1.0 | 67.6 | 2.3 | 60.5 | 2.57 | 13.9 | 28.5 | 44 | 9.8 | 34.8 | 94 | 12 |
| 2 | 50 | 50 | 5.0 | 1,930 | 3,190 | 435 | 1,830 | 260 | 63.2 | 147.4 | 165.5 | 1.7 | 65.3 | 13.1 | 55.5 | 3.23 | 15.9 | 28 | 43 | 10 | 36.2 | 100 | 12 |
| 3 | 25 | 75 | 7.5 | 1,700 | 3,680 | 525 | 1,720 | 270 | 62.8 | 141.5 | 132.5 | 1.8 | 65.7 | 10.3 | 55 | 3.39 | 17.4 | 31.5 | 46.5 | 11.8 | 35.2 | 100 | 12 |
| 4 | ---- | 100 | 10.0 | 1,440 | 3,640 | 595 | 2,300 | 410 | 66.9 | 112.6 | 119.2 | 2.5 | 62.4 | 16.3 | 54 | 4.13 | 19.1 | 35.5 | 49 | 12.5 | 35.0 | 100 | 12 |
| 5 | ---- | 100 | 10.0 | 1,330 | 3,750 | 640 | 2,000 | 360 | 70.3 | 102.9 | 111.9 | 3.8 | 62.4 | 30.0 | 54.5 | 4.09 | 21.0 | 37.5 | 49.5 | 16.5 | 33.7 | 100 | 12— |
| 6 | 50 | 50 | ----- | 2,480 | 3,300 | 380 | 1,540 | 200 | 65.5 | 183.2 | 200.2 | 0.7 | 66.3 | 11.2 | 58.5 | 3.40 | 14.8 | 33.5 | 48.5 | 9.5 | 38.0 | 101.5 | 12 |
| 7 | 25 | 75 | ----- | 2,430 | 3,970 | 470 | 2,030 | 240 | 66.6 | 188.0 | 240.8 | 1.7 | 64.5 | 12.5 | 60 | 3.28 | 15.4 | 40.5 | 57 | 9.5 | 36.0 | 100.5 | 12 |
| 8 | ---- | 100 | 5.0 | 1,890 | 3,970 | 520 | 2,290 | 310 | 67.2 | 141.5 | 157.0 | 2.4 | 63.3 | 18.3 | 57 | 3.72 | 18.1 | 43 | 58 | 11.5 | 34.2 | 99.5 | 12 |
| 9 | ---- | 100 | 5.0 | 1,570 | 3,820 | 575 | 2,200 | 330 | 68.9 | 140.0 | 128.2 | 3.1 | 61.9 | 26.7 | 57 | 3.68 | 19.0 | 45 | 58.5 | 13.0 | 36.5 | 100.5 | 12 |

AGED 24 HRS./212° F.

| | | | | | | | | | | | | | | | | | | | | | | | |
|---|---|---|---|---|---|---|---|---|---|---|---|---|---|---|---|---|---|---|---|---|---|---|---|
| 1 | 100 | ---- | ----- | ----- | 2,470 | 230 | 1,180 | 115 | 57.8 | 280.1 | 474.5 | 0.4 | 72.1 | <0.1 | 67 | 3.31 | ---- | ---- | ---- | ---- | ---- | ---- | ---- |
| 2 | 50 | 50 | 5.0 | 2,930 | 3,070 | 320 | 1,500 | 170 | 58.5 | 193.0 | 273.2 | 0.7 | 69.8 | 4.0 | 63 | 4.13 | ---- | ---- | ---- | ---- | ---- | ---- | ---- |
| 3 | 25 | 75 | 7.5 | 2,710 | 3,510 | 370 | 1,310 | 165 | 57.8 | 193.0 | 222.8 | 0.3 | 70.1 | 6.1 | 63 | 4.70 | ---- | ---- | ---- | ---- | ---- | ---- | ---- |
| 4 | ---- | 100 | 10.0 | 2,470 | 3,710 | 440 | 2,120 | 235 | 58.5 | 170.1 | 197.8 | 0.5 | 68.2 | 5.3 | 61 | 5.53 | ---- | ---- | ---- | ---- | ---- | ---- | ---- |
| 5 | ---- | 100 | 10.0 | 2,120 | 3,780 | 470 | 1,850 | 230 | 58.8 | 170.1 | 184.5 | 0.7 | 67.6 | 9.9 | 62 | 5.36 | ---- | ---- | ---- | ---- | ---- | ---- | ---- |
| 6 | 50 | 50 | ----- | ----- | 3,360 | 270 | 1,630 | 135 | 62.5 | 318.0 | 431.0 | 0.5 | 69.3 | 1.0 | 65 | 4.24 | ---- | ---- | ---- | ---- | ---- | ---- | ---- |
| 7 | 25 | 75 | ----- | 3,620 | 3,620 | 300 | 1,810 | 170 | 60.8 | 280.0 | 347.0 | 0.5 | 68.8 | 4.2 | 65.5 | 4.32 | ---- | ---- | ---- | ---- | ---- | ---- | ---- |
| 8 | ---- | 100 | 5.0 | 2,850 | 3,710 | 355 | 1,680 | 185 | 60.8 | 207.0 | 349.0 | 0.6 | 68.8 | 6.1 | 63.5 | 5.05 | ---- | ---- | ---- | ---- | ---- | ---- | ---- |
| 9 | ---- | 100 | 5.0 | 2,720 | 3,740 | 380 | 1,470 | 165 | 61.2 | 233.5 | 197.4 | 0.6 | 68.4 | 6.5 | 64 | 4.99 | ---- | ---- | ---- | ---- | ---- | ---- | ---- |

[1] A blend of equal parts Circosol-2XH (a petroleum hydrocarbon softener) and Paraflux (an asphaltic flux).
[2] 45 minute cure at 307° F.
[3] Thousands of flexures to failure.
[4] Parts per 100 parts rubber.

The foregoing data shows that a butadiene-styrene copolymer suffers no degradation in properties when compounded with the polybutadiene of my invention, and certain of the properties such as abrasion loss characteristics are improved. The polybutadiene of my invention is an excellent plasticizing agent and thus can be used to advantage in the processing of synthetic rubbers without loss of desirable properties as is the case with many plasticizing agents.

*Example IV*

A series of runs was made to determine the effect of high black, and also high softener, loadings on the properties of polybutadiene prepared according to Example I. The following compounding recipe was used:

| | Parts by weight |
|---|---|
| Polybutadiene | 100 |
| Philblack O[1] | 50, 65, 75 |
| Circosol-2XH-Paraflux[2] | variable |
| Zinc oxide | 3 |
| Stearic acid | 1 |
| Flexamine[3] | 1 |
| Sulfur | 2.25 |
| Santocure[4] | 1.5 |

[1] A trade-mark of Phillips Petroleum Company.
[2] A blend of equal parts of Circosol-2XH (a petroleum hydrocarbon softener) and Paraflux (an asphaltic flux).
[3] Mixture containing 65 per cent of a complex diarylamine-ketone reaction product and 35 per cent N,N'-diphenyl-p-phenylenediamine.
[4] N-cyclohexyl-2-benzothiazolesulfenamide.

The mixes were milled and cured 30 minutes (except as otherwise specified) at 307° F. and the physical properties determined. The following results were obtained:

POLYBUTADIENE MASTERBATCH

| PHR[1] Philblack O[2] | PHR[1] Circo-Para[6] | 80° F. 300% Modulus, p. s. i. | 80° F. Tensile, p. s. i. | 80° F. Percent Elongation | 200° F.[3] Tensile, p. s. i. | ΔT, ° F. | Percent Resilience | Flex Life, M[5] | Shore Hardness | Abrasion Loss,[4] Grams | Percent Compression Set | MS 1½ at 212° F. | Extrusion at 250° F. In./Min. | Extrusion at 250° F. Gm./Min. |
|---|---|---|---|---|---|---|---|---|---|---|---|---|---|---|
| 50 | -------- | 2,140 | 2,450 | 330 | 1,330 | 64.5 | 66.8 | 4.0 | 63 | 2.88 | 16.9 | 27.5 | 37.8 | 95.5 |
| 65 | -------- | -------- | 2,500 | 270 | 1,720 | 83.7 | 58.7 | 1.0 | 69.5 | 2.17 | 15.0 | 37 | 45.8 | 100 |
| 65 | 10 | 1,980 | 2,330 | 350 | 1,390 | 77.1 | 59.1 | 4.2 | 64 | 2.59 | 18.9 | 27.5 | 49 | 100 |
| 75 | 10 | -------- | 2,400 | 290 | 1,580 | 85.2 | 57.3 | 2.7 | 69 | 2.37 | 17.8 | 34.5 | 50.2 | 95 |
| 75 | 15 | 2,080 | 2,270 | 310 | 1,300 | 87.5 | 54.4 | 12.4 | 64.5 | 2.49 | 20.1 | 30 | 50.8 | 89 |

OVEN AGED 24 HOURS AT 212° F.—POLYBUTADIENE MASTERBATCH

| | | | | | | | | | | | | | | |
|---|---|---|---|---|---|---|---|---|---|---|---|---|---|---|
| 50 | -------- | -------- | 1,910 | 180 | -------- | 60.2 | 72.9 | <0.1 | 69 | 3.54 | -------- | -------- | -------- | -------- |
| 65 | -------- | -------- | 2,610 | 180 | -------- | 79.7 | 64.5 | <0.1 | 75 | 2.73 | -------- | -------- | -------- | -------- |
| 65 | 10 | -------- | 2,280 | 230 | -------- | 74.7 | 64.1 | <0.1 | 71 | 3.24 | -------- | -------- | -------- | -------- |
| 75 | 10 | -------- | 2,000 | 160 | -------- | 82.6 | 62.9 | <0.1 | 75.5 | 2.87 | -------- | -------- | -------- | -------- |
| 75 | 15 | -------- | 2,270 | 210 | -------- | 82.9 | 59.9 | <0.2 | 74 | 3.06 | -------- | -------- | -------- | -------- |

[1] Parts per 100 parts rubber.
[2] A trade-mark of Phillips Petroleum Company.
[3] 45 minute cures.
[4] 35 minute cures.
[5] Thousands of flexures to failure.
[6] A blend of equal parts of Circosol-2XH ( a petroleum hydrocarbon softener) and Paraflux (an asphaltic flux).

The foregoing data show that the carbon black loading of the polybutadiene of my invention can be as high as 75 parts black per 100 parts polybutadiene without significant loss of desirable properties. The economic advantage of the use of such high percentages of filler without sacrifice of desirable properties is obvious. The ability of the polybutadiene of my invention to accommodate high black loadings is an important advantage not possessed by the polybutadiene known to the art.

I claim:

1. A process for the production of synthetic rubber which comprises homopolymerizing butadiene in the presence of an emulsifying agent in an aqueous medium at a polymerization temperature in the range of 60° to 95° F. in the presence of sufficient of an alkyl mercaptan modifier to yield a polymer having an uncompounded Mooney viscosity in the range of 20 to 35 and masterbatching the latex resulting from said polymerizing with carbon black prior to coagulation of said polymer.

2. A process for the production of synthetic rubber, which comprises homopolymerizing butadiene in the presence of an emulsifying agent in an aqueous medium at a temperature in the range of 60° to 95° F. in the presence of an alkyl mercaptan modifying agent in an amount in the range of 0.2 to 1 part per 100 parts of said butadiene to yield a polymer having an uncompounded Mooney viscosity in the range of 20 to 35, and masterbatching the latex resulting from said polymerizing with carbon black prior to coagulation of said polymer.

3. A process for the production of synthetic rubber, which comprises homopolymerizing butadiene in the presence of an emulsifying agent in an aqueous medium at a temperature in the range of 60° to 95° F. in the presence of an alkyl mercaptan modifying agent in an amount in the range of 0.2 to 1 part per 100 parts of said butadiene to yield a polymer having an uncompounded Mooney viscosity in the range of 20 to 35, and masterbatching the latex resulting from said polymerizing with carbon black in an amount in the range of 20 to 75 parts carbon black per 100 parts of solids in said latex prior to coagulation of said polymer.

4. A process according to claim 3 wherein said alkyl mercaptan modifying agent is a tertiary mercaptan containing from 8 to 16 carbon atoms.

5. A process according to claim 3 wherein said carbon black is a high abrasion furnace carbon black.

6. In a process for homopolymerizing butadiene while dispersed in an aqueous medium in the presence of an emulsifying agent, an oxidant-reductant combination, and a tertiary alkyl mercaptan modifying agent containing from 8 to 16 carbon atoms, the improvement which comprises effecting said polymerizing at a temperature of 86° F. in the presence of an alkyl mercaptan modifying agent in an amount in the range of 0.2 to 1 part per 100 parts of said butadiene to yield a polymer having an uncompounded Mooney viscosity in the range of 20 to 35, and masterbatching the latex resulting from said polymerizing with carbon black prior to coagulation of said polymer.

7. A process according to claim 6 wherein said carbon black is employed in an amount in the range of 20 to 75 parts carbon black per 100 parts solids in said latex.

8. A process according to claim 7 wherein said emulsifying agent is a rosin acid soap employed in an amount in the range of 0.3 to 5 parts per 100 parts of said butadiene, and wherein said oxidant-reductant combination comprises an organic hydroperoxide employed in an amount in the range of 0.01 to 10 millimols of organic hydroperoxide per 100 parts by weight of butadiene, and a ferrous pyrophosphate activator employed in an amount in the range of 0.10 to 3 millimols of ferrous pyrophosphate per 100 parts by weight of said butadiene.

9. A process according to claim 8 wherein said organic hydroperoxide is dimethylphenylhydroperoxymethane.

10. A process according to claim 9 wherein said ferrous pyrophosphate activator is a sodium ferrous pyrophosphate complex.

11. A process for the production of synthetic rubber which comprises homopolymerizing butadiene in the presence of an emulsifying agent in an aqueous medium at a polymerization temperature of 86° F. in the presence of sufficient alkyl mercaptan modifier to yield a polymer having an uncompounded Mooney viscosity in the range of 20 to 35, masterbatching the latex resulting from said polymerizing with carbon black, and thereafter coagulating said polymer to produce said synthetic rubber.

12. A process according to claim 11 wherein said alkyl mercaptan modifier is utilized in an amount in the range of 0.2 to 1 part per 100 parts of said butadiene, and wherein said carbon black is utilized in an amount in the range of 20 to 75 parts carbon black per 100 parts of solids in said latex.

13. A process according to claim 12 wherein said alkyl mercaptan is a tertiary mercaptan containing 8 to 16 carbon atoms, and wherein said carbon black is a high abrasion furnace carbon black.

References Cited in the file of this patent

UNITED STATES PATENTS

| Number | Name | Date |
|---|---|---|
| 1,826,846 | Tschunkur | Oct. 13, 1931 |
| 2,512,697 | Te Grotenhuis | June 27, 1950 |
| 2,538,809 | Te Grotenhuis | Jan. 23, 1951 |

OTHER REFERENCES

"Styreneless Rubber"—Chemical Engineering, 57, page 107 (September 1950).

O'Connor—Rubber Age 54, 423–427 (February 1944).

Johnson—Rubber Age (April 1949), page 54.